(12) United States Patent
Matsen et al.

(10) Patent No.: US 8,343,402 B1
(45) Date of Patent: Jan. 1, 2013

(54) CONSOLIDATION OF COMPOSITE MATERIAL

(75) Inventors: Marc R. Matsen, Seattle, WA (US); Wesley B. Crow, Bellevue, WA (US); Brad L. Kirkwood, Kent, WA (US)

(73) Assignee: The Boeing Company, Chicago, IL (US)

( * ) Notice: Subject to any disclaimer, the term of this patent is extended or adjusted under 35 U.S.C. 154(b) by 425 days.

(21) Appl. No.: 12/625,354

(22) Filed: Nov. 24, 2009

Related U.S. Application Data

(63) Continuation-in-part of application No. 11/859,098, filed on Sep. 21, 2007, which is a continuation-in-part of application No. 11/854,733, filed on Sep. 13, 2007, now Pat. No. 8,017,059.

(51) Int. Cl.
*B22F 3/04* (2006.01)

(52) U.S. Cl. ........ 264/125; 264/109; 264/403; 264/486; 264/571; 264/604; 425/78; 425/405.1

(58) Field of Classification Search ............. 264/109, 264/125, 313, 314, 403, 486, 570, 571, 603, 264/604; 425/77, 78, 195, 352, 394, 405.1, 425/405.2
See application file for complete search history.

(56) References Cited

U.S. PATENT DOCUMENTS

| | | | | |
|---|---|---|---|---|
| 2,993,786 A * | 7/1961 | Roboff et al. | ..................... | 419/8 |
| 3,454,685 A * | 7/1969 | Parsons et al. | ............... | 264/1.21 |
| 4,527,970 A * | 7/1985 | Murley | ......................... | 425/404 |
| 4,596,694 A * | 6/1986 | Rozmus | .......................... | 419/49 |
| 4,597,730 A * | 7/1986 | Rozmus | .......................... | 425/78 |
| 4,636,341 A * | 1/1987 | Murley | ...................... | 264/37.17 |
| 4,724,123 A * | 2/1988 | Rozmus, Jr. | ..................... | 419/68 |
| 4,761,262 A * | 8/1988 | Ogata et al. | ...................... | 419/10 |
| 5,049,053 A * | 9/1991 | Tabaru | ............................. | 425/3 |
| 5,049,329 A * | 9/1991 | Allaire et al. | ................. | 264/570 |
| 5,225,015 A * | 7/1993 | Allaire et al. | .............. | 156/89.26 |
| 5,338,372 A * | 8/1994 | Tabaru | ......................... | 148/103 |
| 5,530,227 A * | 6/1996 | Matsen et al. | ................. | 219/633 |
| 5,591,369 A * | 1/1997 | Matsen et al. | ................. | 219/633 |
| 5,591,370 A * | 1/1997 | Matsen et al. | ................. | 219/645 |
| 5,592,988 A * | 1/1997 | Meroni et al. | ................. | 164/478 |
| 5,683,608 A * | 11/1997 | Matsen et al. | ................. | 219/676 |
| 5,747,179 A * | 5/1998 | Matsen et al. | ................. | 428/586 |
| 5,772,946 A * | 6/1998 | Kaminaga et al. | ............ | 264/313 |
| 6,211,497 B1 * | 4/2001 | Matsen et al. | ................. | 219/645 |
| 6,221,813 B1 * | 4/2001 | Riedel et al. | ..................... | 505/432 |
| 6,283,195 B1 * | 9/2001 | Chandley et al. | .............. | 164/113 |
| 7,037,465 B2 * | 5/2006 | Ogawa | ............................ | 419/38 |
| 2004/0101429 A1 * | 5/2004 | Ogawa | ............................ | 419/28 |
| 2005/0045303 A1 * | 3/2005 | Itoyama et al. | ................ | 164/453 |
| 2006/0102316 A1 * | 5/2006 | Itoyama et al. | ................ | 164/466 |
| 2009/0071217 A1 | 3/2009 | Matsen et al. | | |
| 2009/0074905 A1 | 3/2009 | Matsen et al. | | |

* cited by examiner

*Primary Examiner* — Joseph Del Sole
*Assistant Examiner* — Seyed Masoud Malekzadeh
(74) *Attorney, Agent, or Firm* — Caven & Aghevli LLC

(57) ABSTRACT

In one embodiment method to form a composite part from a metallic composite powder, comprises positioning a metallic composite powder preform in a mold cavity formed by a first susceptor and a second susceptor, heating the mold cavity to a first processing temperature, applying a pressure to the mold cavity, and applying a thermal oscillation cycle to the mold cavity, wherein the thermal oscillation cycle oscillates the temperature of the mold cavity between a first temperature in which the metallic composite powder is in a first phase and a second temperature in which the metallic composite powder is in a second phase, different from the first phase.

10 Claims, 8 Drawing Sheets

CONSOLIDATION OF COMPOSITE MATERIAL

RELATED APPLICATIONS

This application is a continuation-in-part of U.S. patent application Ser. No. 11/859,098 to Matsen, et al., entitled METHOD AND APPARATUS FOR RESIN TRANSFER MOLDING COMPOSITE PARTS, filed Sep. 21, 2007, which is a continuation-in-part of U.S. patent application Ser. No. 11/854,733 to Matsen, et al., filed Sep. 13, 2007, now U.S. Pat. No. 8,017,059, entitled COMPOSITE FABRICATION APPARATUS AND METHOD, the disclosures of which are incorporated herein by reference in its entirety.

FIELD OF THE DISCLOSURE

The subject matter described herein relates to composite fabrication apparatus and methods. More particularly, the disclosure relates to a composite fabrication apparatus and method which may be useful for forming near-net shape parts from a metallic powder composition.

BACKGROUND

Certain metallic composite materials may offer performance enhancement for high temperature structures useful in structures and engine applications, e.g., for airspeeds beyond Mach 2. Some metallic or metal composite materials have limited ductility, which makes it difficult to form components from these materials. Therefore, apparatus and methods to form components from or consolidate metallic or metal composite materials from powders have utility.

SUMMARY

In various aspects, apparatus and methods to consolidate a composite material are disclosed. In one aspect there is provided. In one embodiment, the method comprises placing a metallic composite powder preform in a first susceptor, covering at least a portion of the metallic composite powder with a hydrostatic pressing medium, positioning the first susceptor in a first die, positioning a second susceptor in a second die, opposite the first susceptor, moving at least one of the first die or the second die to bring the first susceptor in contact with the second susceptor, thereby forming a mold cavity, sealing at least a portion of the mold cavity, applying a vacuum to at least a portion of the mold cavity, heating the mold cavity to a first processing temperature, applying a pressure to the mold cavity, and applying a thermal oscillation cycle to the mold cavity. In some embodiments the thermal oscillation cycle oscillates the temperature of the mold cavity between a first temperature in which the metallic composite powder is in a first phase and a second temperature in which the metallic composite powder is in a second phase, different from the first phase.

In another aspect there is provided an apparatus to form a composite part from a metallic composite powder preform. In one embodiment, the apparatus comprises a first die and a second die, cooperable with the first die, a first susceptor coupled to the first die and a second susceptor coupled to the second die, wherein the first and second susceptors define a mold cavity to receive the metallic composite powder preform, and wherein the mold cavity defines a configuration of the composite part, and a temperature control system to apply a thermal oscillation cycle to the mold cavity, wherein the thermal oscillation cycle oscillates the temperature of the mold cavity between a first temperature in which the metallic composite powder is in a first phase and a second temperature in which the metallic composite powder is in a second phase, different from the first phase, and a hydrostatic pressing medium disposed within the mold cavity and proximate at least one side of the metallic composite powder preform.

In yet another aspect, there is provided a method to form a composite part from a metallic composite powder. In one embodiment the method comprises positioning a metallic composite powder preform in a mold cavity formed by a first susceptor and a second susceptor, heating the mold cavity to a first processing temperature, applying a pressure to the mold cavity, and applying a thermal oscillation cycle to the mold cavity, wherein the thermal oscillation cycle oscillates the temperature of the mold cavity between a first temperature in which the metallic composite powder is in a first phase and a second temperature in which the metallic composite powder is in a second phase, different from the first phase.

The features, functions and advantages discussed herein can be achieved independently in various embodiments described herein or may be combined in yet other embodiments, further details of which can be seen with reference to the following description and drawings.

BRIEF DESCRIPTION OF THE DRAWINGS

The detailed description is described with reference to the accompanying figures.

DETAILED DESCRIPTION

Figure 1:
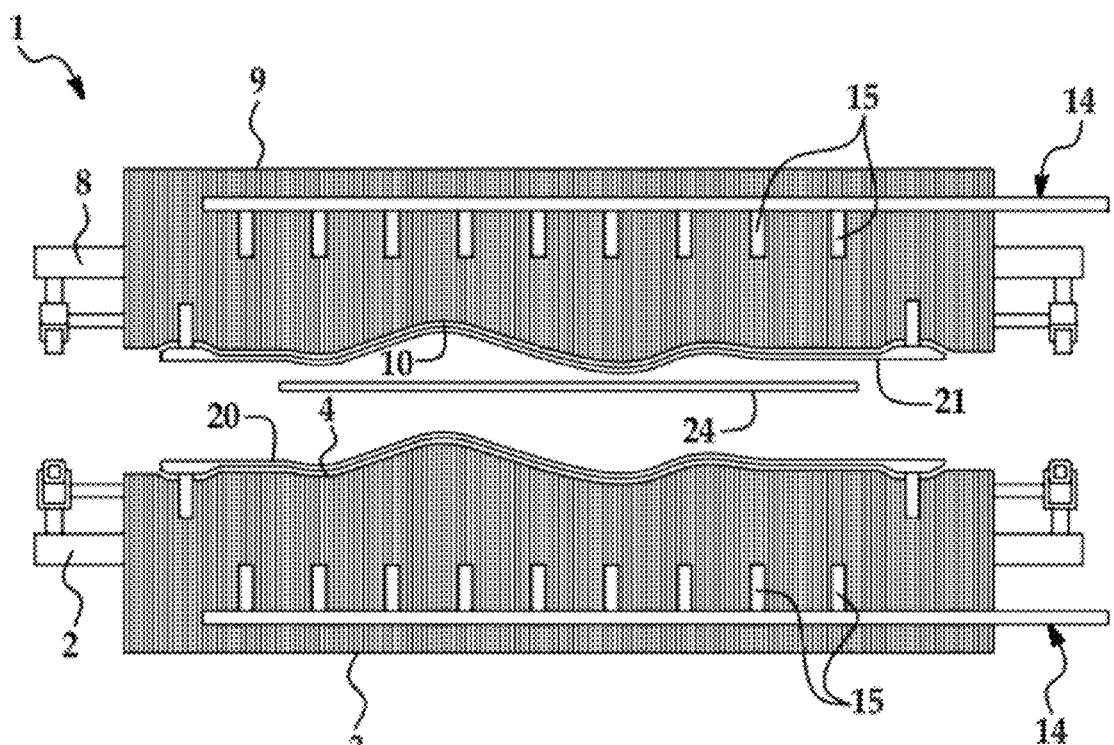
FIG. 1 is a sectional view of a pair of tooling dies of a stacked tooling apparatus with molding compounds positioned between the tooling dies, according to embodiments.

Described herein are exemplary apparatus and methods for consolidation of a metal or metal matrix composite material. Such consolidation may be useful, e.g., in processes to form parts from metallic powders and fibers/particles to form a metal matrix composite part or without fibers/particles to form a high density powder metal part.

In some embodiments, the metal powder may comprise a nickel or titanium aluminides, such as IC-221, a nickel aluminide based alloy, Ti—25a/o Al—10% Nb, an alphaII titanium aluminide, or Ti—38a/o Al—10% Nb, a alphaII-gamma titanium aluminide. Titanium aluminide matrix materials, such as Ti—25a/o Al—10% Nb undergo an order-disorder transformation at ~1170 C which gives the potential to solutionize and precipitate alpha II and beta phases from the higher temperature alpha phase, where solid state sintering should be rapid. The Ti—40a/o—10% Nb alloy undergoes a eutectoid transformation at 1111 C, so that lamellar $Ti_3Al$ or alpha2, and TiAl gamma microstructures of differing colony sizes and lamellar spacing's can be produced through through rapid thermal oscillations. That the resulting microstructure would have large colony and lammelae spacings that would enhance the lower temperature ductility and toughness. Nickel aluminide and nickel based superalloy powders or metal matrices can form unique precipitation microstructures on the grain boundaries by rapidly oscillating the temperature about the nickel solvus temperature. After sintering or consolidation is complete, the temperature can be rapidly lowered in the powder compact to obtain the desired $Ni_3Al$ precipitate size distribution for optimum strength at the desired use temperature.

In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Referring initially to FIGS. 1-7 of the drawings, a stacked tooling apparatus which is suitable for implementation of the composite fabrication method is generally indicated by reference numeral 1. The stacked tooling apparatus 1 may include a first die frame 2 and a second die frame 8. A first tooling die 3 may be provided on the first die frame 2, and a second tooling die 9 may be provided on the second die frame 8. The first tooling die 3 and the second tooling die 9 may be hydraulically-actuated to facilitate movement of the first tooling die 3 and the second tooling die 9 toward and away from each other. The first tooling die 3 may have a first contoured die surface 4, whereas the second tooling die 9 may have a second contoured die surface 10 which is complementary to the first contoured die surface 4 of the first tooling die 3.

Figure 5:
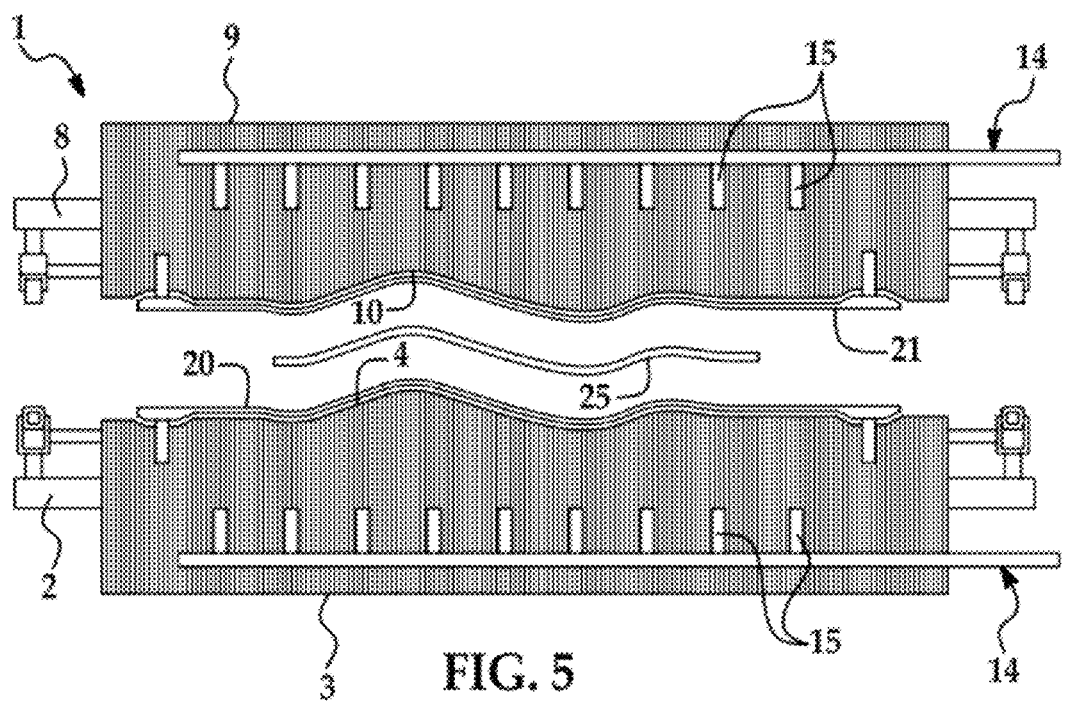
FIG. 5 is a sectional view of the tooling dies with the tooling dies and die susceptors released from the composite sheet after forming and cooling of the composite sheet, according to embodiments.
Figure 6:
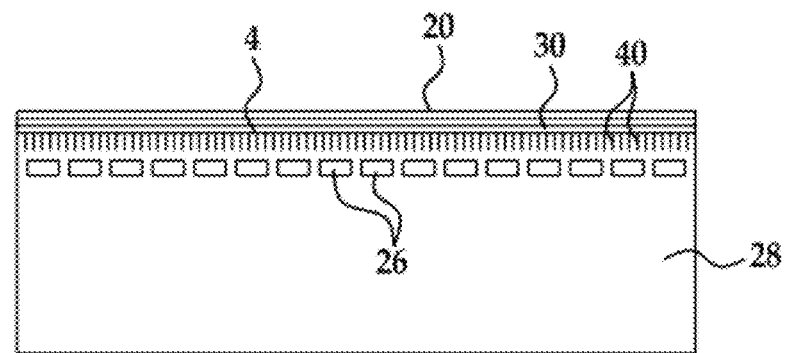
FIG. 6 is a schematic view of a tooling die, more particularly illustrating a die susceptor and die liner provided on the engaging surface of the tooling die and multiple induction coils extending through the tooling die, according to embodiments.

As shown in FIG. 6, multiple induction coils 26 may extend through each of the first tooling die 3 (and the second tooling die 9, not shown) to facilitate selective heating of the first tooling die 3 and the second tooling die 9 through the susceptors. A thermal control system 27 may be connected to the induction coils 26 to oscillate the induction power output. The first die susceptor 20 absorbs the electromagnetic field created by the induction coils 26 of both tooling dies 3. A second die susceptor 21 also absorbs the electromagnetic field created by the induction coils 26 of both tooling dies. Each of the first die susceptor 20 and the second die susceptor 21 are ferromagnetic materials consisting of, cobalt, nickel, and iron and all ternary alloys thereof, and as metallic alloys, are all thermally-conductive to transfer the heat absorbed into the part. As shown in FIGS. 1-5, the first die susceptor 20 may generally conform to the first contoured die surface 4 and the second die susceptor 21 may generally conform to the second contoured die surface 10.

As shown in FIG. 6, an electrically and thermally insulative coating 30 may be provided on the first contoured die surface 4 of the first tooling die 3, as shown, and on the second contoured die surface 10 of the second tooling die 9 (not shown). The electrically and thermally insulative coating 30 may be added, for example, alumina or as a moderate insulator, silicon carbide. The first die susceptor 20 may be provided on the electrically and thermally insulative coating of the first tooling die 3, as shown, and the second die susceptor 21 may be provided on the electrically and thermally insulative coating 30 of the second tooling die 9 (not shown).

Figure 4:
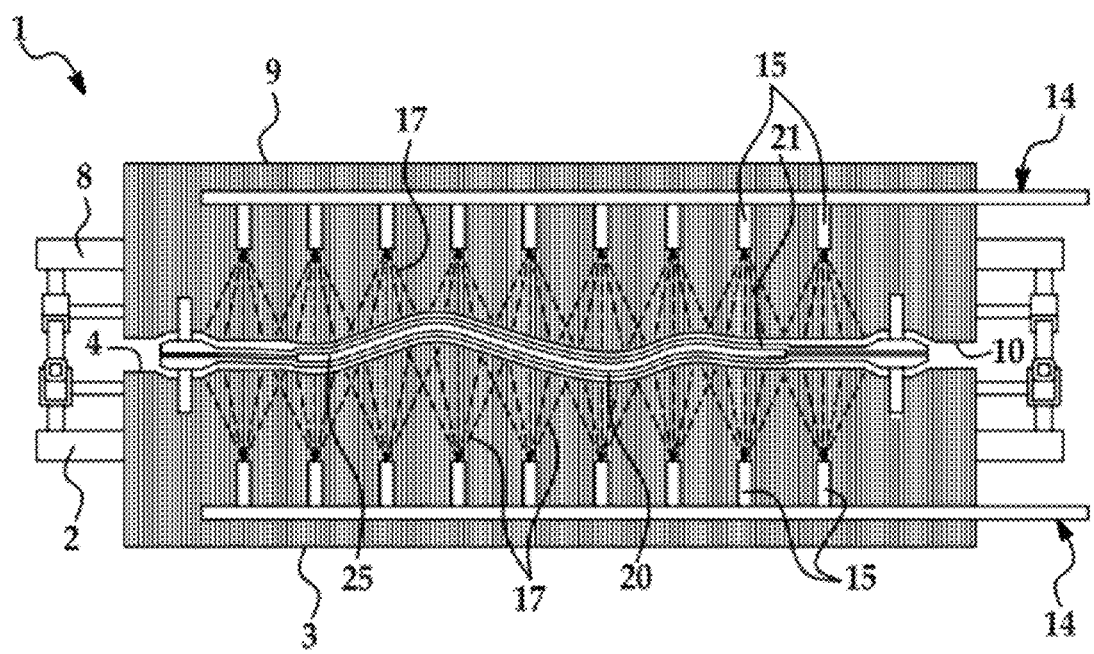
FIG. 4 is a sectional view of the tooling dies with the tooling dies closed against the die susceptors and composite sheet and a cooling system engaged to cool the tooling dies, according to embodiments.

As shown in FIGS. 1-5, a cooling system 14 may be provided in each of the first tooling die 3 and the second tooling die 9. The cooling system 14 may include, for example, coolant conduits 15 which have a selected distribution throughout each of the first tooling die 3 and the second tooling die 9. As shown in FIG. 4, the coolant conduit 15 may be adapted to discharge a cooling medium 17 into the first tooling die 3 or the second tooling die 9. The cooling medium 17 may be a liquid, gas or gas/liquid mixture which may be applied as a mist or aerosol, for example.

Figure 7:
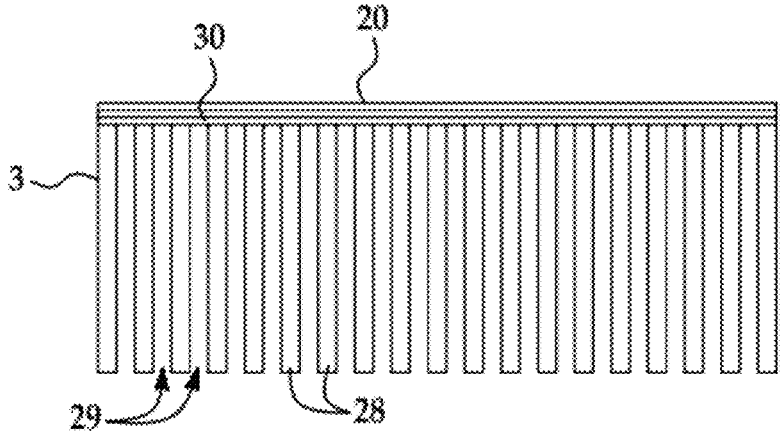
FIG. 7 is a front sectional view of a tooling die, more particularly illustrating multiple induction coils and multiple thermal expansion slots provided in the metal sheet, according to embodiments.

Each of the first tooling die 3 and the second tooling die 9 may each include multiple stacked metal sheets 28 such as stainless steel which are trimmed to the appropriate dimensions for the induction coils 26. This is shown in FIGS. 6 and 7. The stacked metal sheets 28 may be oriented in generally perpendicular relationship with respect to the first contoured die surface 4 and the second contoured die surface 10. Each metal sheet 28 may have a thickness of from about 1/16 inch to about 1/2 inch, for example and preferably 1/8 inch. An air gap 29 may be provided between adjacent stacked metal sheets 28 to facilitate cooling of the first tooling die 3 and the second tooling die 9 (not shown). The stacked metal sheets 28 may be attached to each other using clamps (not shown), fasteners (not shown) and/or other suitable technique known to those skilled in the art. The stacked metal sheets 28 may be selected based on their electrical and thermal properties and may be transparent to the magnetic field. An electrically insulating coating (not shown) may, optionally, be provided on each side of each stacked sheet 28 to prevent flow of electrical current between the stacked metal sheets 28. The insulating coating may be a material such as ceramic, for example, or other high temperature resistant materials. However, if an air gap exists inbetween the stacked sheets, then no coating would be necessary. Multiple thermal expansion slots 40 may be provided in each stacked sheet 28, as shown in FIG. 6, to facilitate thermal expansion and contraction of the stacked tooling apparatus 1.

Figure 2:
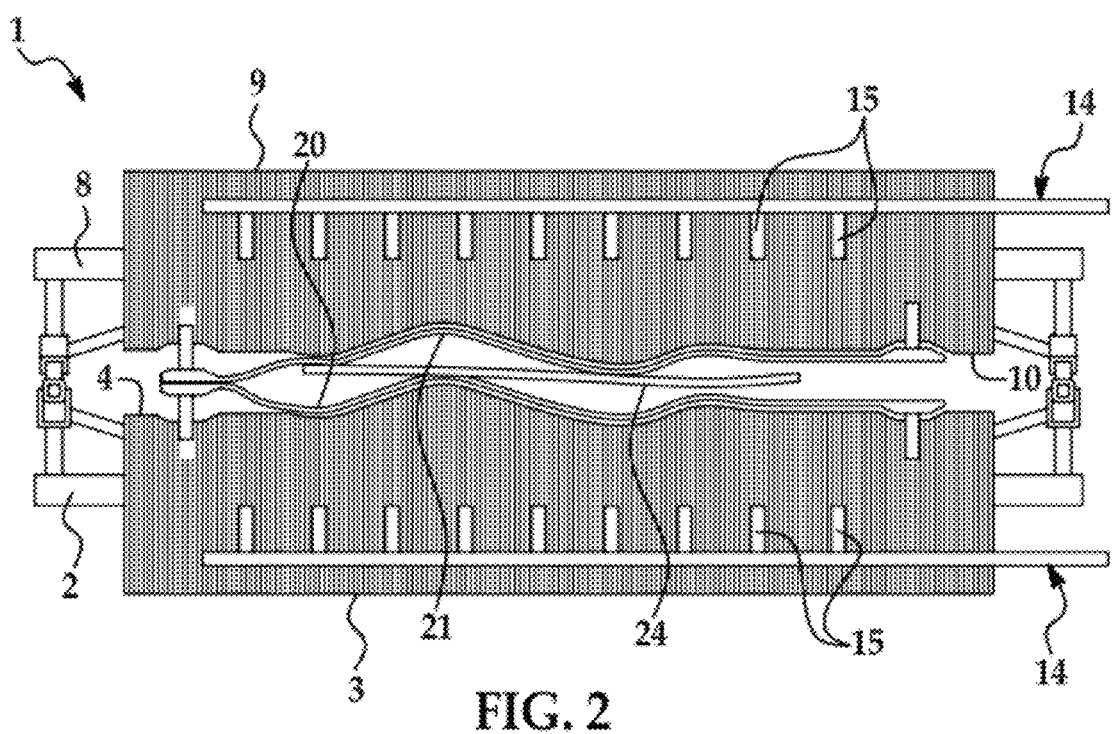
FIG. 2 is a sectional view of a pair of tooling dies with the molding compounds enclosed between a pair of die susceptors provided on the tooling dies, according to embodiments.
Figure 3:
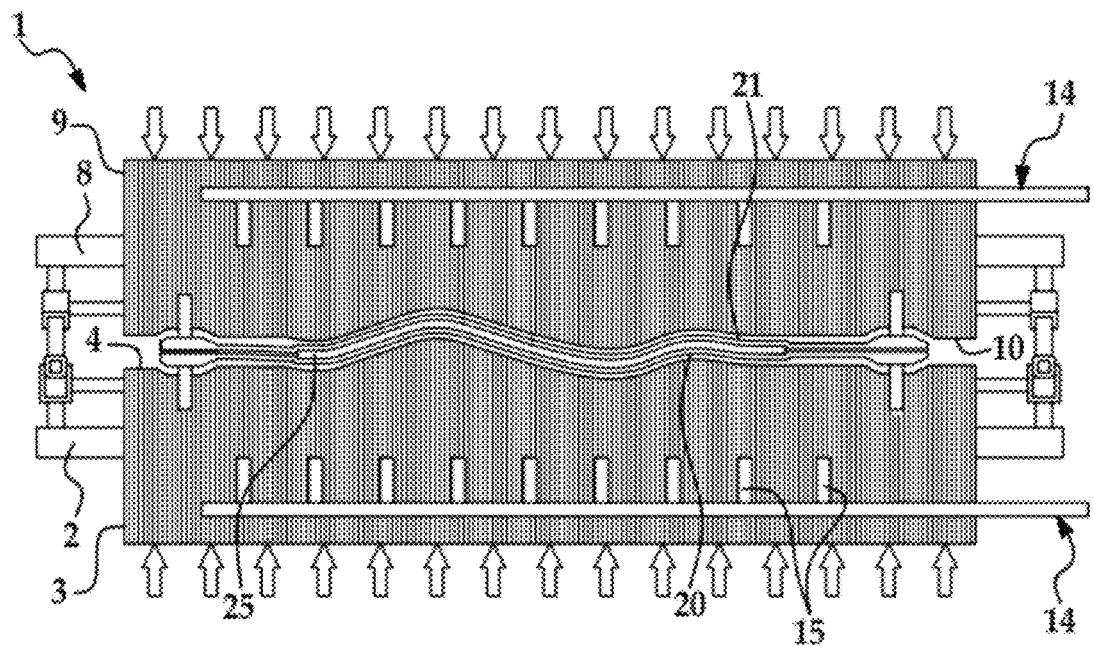
FIG. 3 is a sectional view of the tooling dies with the tooling dies applying pressure to form and consolidate a composite sheet, according to embodiments.

In typical implementation of the composite fabrication method, molding compounds 24 are initially positioned between the first tooling die 3 and the second tooling die 9 of the stacked tooling apparatus 1, as shown in FIG. 1. The first tooling die 3 and the second tooling die 9 are next moved toward each other, as shown in FIG. 2, as the induction coils 26 (FIG. 6) heat the first tooling die 3 and the second tooling die 9 as well as the first die susceptor 20 and the second die susceptor 21. Therefore, as the first tooling die 3 and the second tooling die 9 close toward each other, the first die susceptor 20 and the second die susceptor 21 rapidly heat the molding compounds 24. Thus, the molding compounds 24 which may be thermally molded as the first tooling die 3 and the second tooling die 9 continue to approach and then close against the molding compounds 24, as shown in FIG. 2, forming the molding compounds 24 to the configuration of a composite sheet 25 (shown in FIGS. 3-5) which may be defined by the first contoured surface 4 of the first tooling die 3 and the second contoured surface 10 of the second tooling die 9.

As shown in FIG. 4, the cooling system 14 is next operated to apply the cooling medium 17 to the first tooling die 3 and the second tooling die 9 and to the first die susceptor 20 and the second die susceptor 21. Therefore, the cooling medium 17 actively and rapidly cools the first tooling die 3 and the second tooling die 9 as well as the first die susceptor 20 and the second die susceptor 21, also cooling the composite sheet 25 sandwiched between the first die susceptor 20 and the second die susceptor 21. The composite sheet 25 remains sandwiched between the first tooling die 3 and the second tooling die 9 for a predetermined period of time until complete cooling of the composite sheet 25 has occurred. This allows the molded and consolidated composite sheet 25 to retain the structural shape which is defined by the first contoured surface 4 and the second contoured surface 10 after the first tooling die 3 and the second tooling die 9 are opened, as shown in FIG. 5. The formed and cooled composite sheet 25 is removed from the stacked tooling apparatus 1 without loss of dimensional accuracy or delamination of the composite sheet 25 when it is cooled at an appropriate property-enhancing rate.

Figure 8:
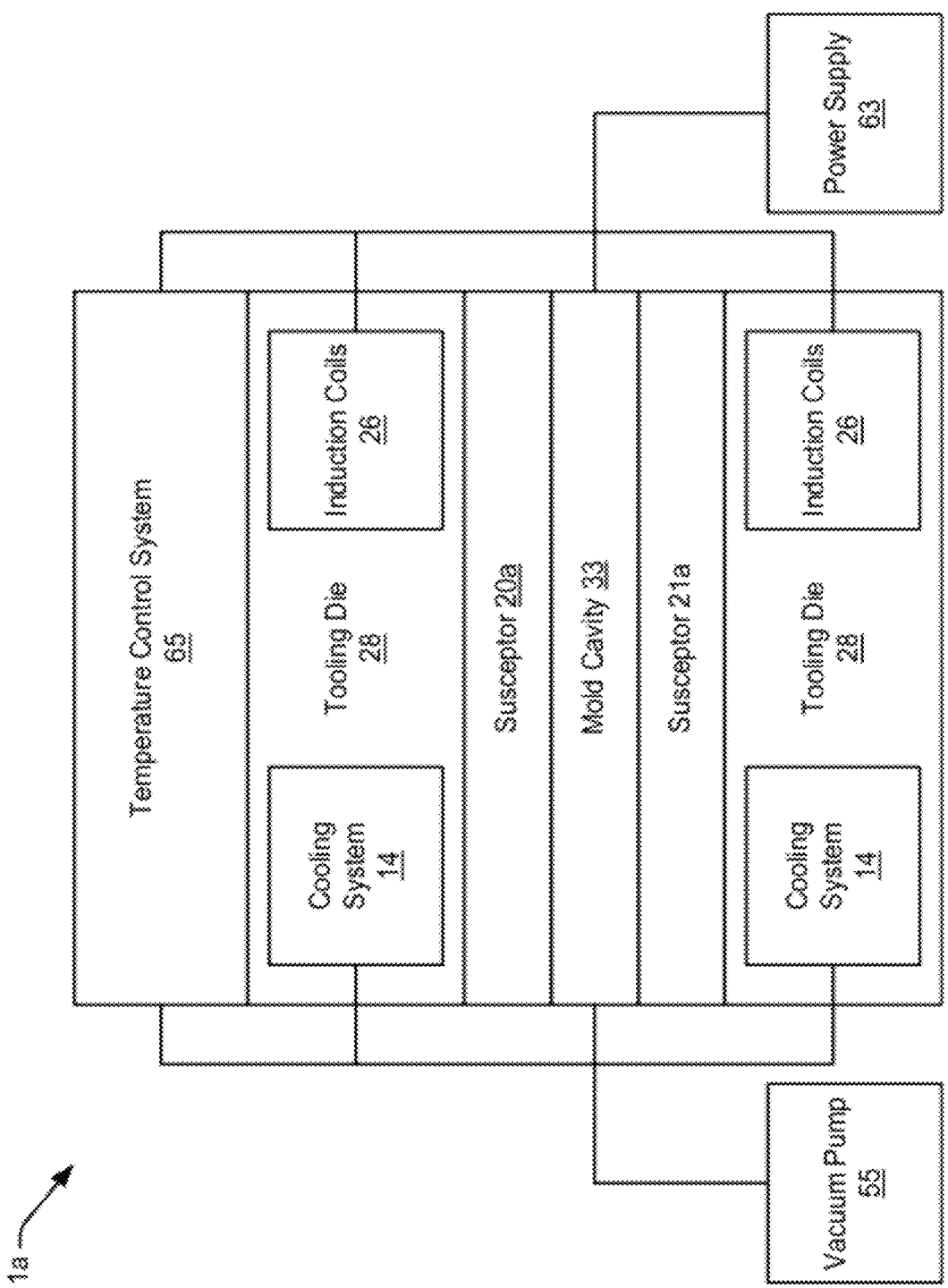
FIG. 8 is a functional block diagram of an alternate embodiment of an apparatus to form a composite part from a metallic composite powder, according to embodiments.
Figure 9:
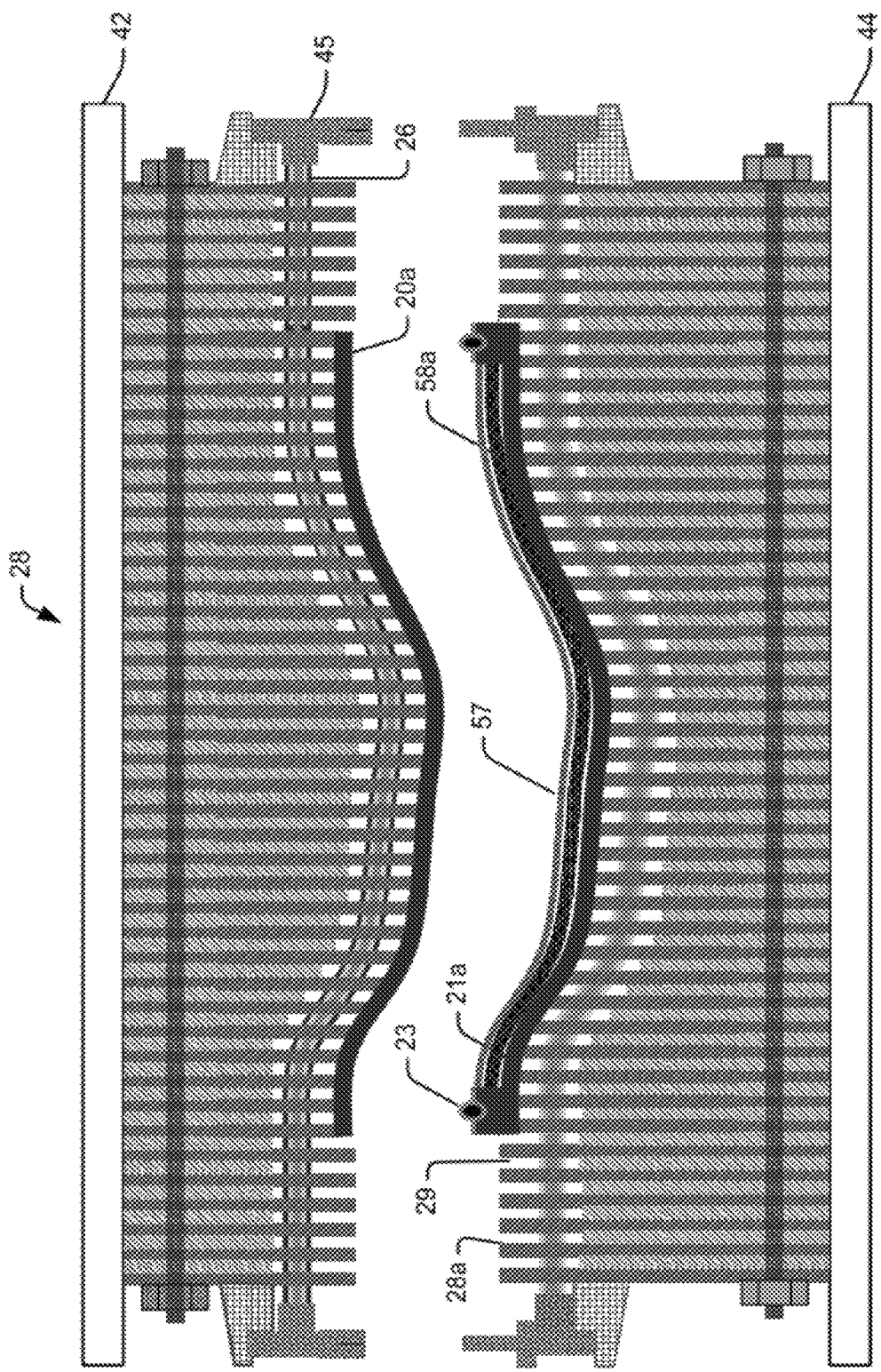
FIG. 9 is a sectional view illustrating the apparatus of FIG. 8, according to embodiments, according to embodiments.

In other embodiments an apparatus to consolidate composite materials may be established using the stacked tooling apparatus depicted in FIGS. 1-7. Attention is now directed to FIGS. 8-11 which illustrate an apparatus and method to form a composite part from a metallic composite powder preform, according to embodiments. An apparatus 1a that may be employed to mold a composite part 58a (FIG. 9). A pair of tooling dies 28 generally similar to those described previously with respect to FIGS. 1-7, are respectively secured to molding press platens 42, 44, allowing the dies 28 to be opened and closed. Like the previously described embodiment, dies 28 comprise a plurality of stacked metal sheets 28a separated by air gaps (or a suitable dielectric) that form passageways 29 between the sheets 28a. As previously described, the use of spaced apart metal plates 28a reduces the overall thermal mass of the die assembly 1a and facilitates more rapid cooling of a formed part.

Dies 28 may include inductive heating coils 26 that are electrically connected together by a socket connection 45 when the dies 28 are closed. The dies 28 have opposed surfaces that are contoured and generally match contoured mold surfaces of a pair of susceptors 20a, 21a. The contoured molding surfaces f the susceptors 20a, 21a match those of a finished composite part, and form a mold cavity 33 (FIG. 8). The susceptors 20a, 21a may comprise a thermally conductive material such as, but not limited to, a ferromagnetic material, cobalt, nickel or compounds thereof. The coils 26 as well as a cooling system 14 are controlled by a suitable temperature control system 65 that control heating and cooling down the susceptors 20a, 21a.

In some embodiments one or more electrically and thermally insulative coatings, e.g., die liners, may be provided on the contoured die surfaces of the dies 28. The electrically and thermally insulative coating may be, for example, alumina or silicon carbide (SiC) and, more particularly, a glass or glass-ceramic oxide matrix with SiC or Nicalon (polymer derived amorphous-crystalline) SiC fibers. The susceptors 20a, 21a may, in turn, be provided on the electrically and thermally insulative coatings of the respective dies.

In the embodiment depicted in FIG. 9, susceptor 21a comprises a seal 23 extending along a perimeter of the susceptor, such that the mold cavity 33 may be sealed. A vacuum pump 55 is connected to the susceptors 20a, 21a to enables a vacuum to be established in the mold cavity 33.

A metallic composite powder preform 58 is disposed within the susceptor 21a. The preform 58 may also be formed of a variety of materials, but in some embodiments is formed from a composition metal comprising one or more metal alloys that experiences a phase change between two solid phases at an elevated temperature and pressure, that is, at a temperature and pressure greater than ambient temperature and pressure and, typically, much greater than ambient temperature and pressure.

By way of example, the metal alloy forming the preform 58 may be a steel or iron alloy. In some embodiments, however, the preform 58 comprises a titanium-aluminide ($Ti_3Al$) alloy, for example $Ti_3Al$, that are formulated to be near the eutectoid composition of 40 a/o or 27 w/o. These alloys change in phase (i.e., back and forth from a eutectoid lammelar structure of TiAl (gamma aluminide) and $Ti_3Al$ (alpha2 aluminide) to Alpha and back again) provide volumetric differences that enable low pressure consolidation that requires relatively low max/min values in thermal cycling (e.g., 50 F difference from peak to peak).

As also shown FIG. 9, a hydrostatic pressing medium 57 disposed within the die cavity so as to be proximate at least one side of the preform 58. While the hydrostatic pressing medium need only be proximate one side of the preform 58, the hydrostatic pressing medium may surround or encapsulate the preform 58 so as to be proximate each size of the preform 58, as in the illustrated embodiment. While the hydrostatic pressing medium may be disposed within the die cavity prior to insertion of the preform 58 so as to be distinct from the preform 58, the hydrostatic pressing medium may be coated or otherwise disposed upon the preform 58 prior to the insertion of the preform 58 into the die cavity such that the preform 58 carries the hydrostatic pressing medium.

In one embodiment the hydrostatic pressing medium 57 comprises a liquid having a relatively high viscosity at the processing pressure and temperatures at which the method and apparatus of embodiments of the present invention consolidate the preform 58. In this regard, the viscosity of the liquid may be at or close to the working point within the thermal cycling range. For example, the viscosity may range from about $10^3$ to about $10^6$ poise for temperatures within the thermal cycling temperature range. Additionally, the liquid generally has a low heat capacity, is transparent to radiant energy, is electrically nonconductive and has a relatively high thermal conductivity. In this regard, the hydrostatic pressing medium may be an amorphous material, such as glass. Additionally, the hydrostatic pressing medium is advantageously non-reactive with the preform 58 at the elevated temperatures at which the preform 58 will be processed and consolidated.

In one embodiment, the hydrostatic pressing medium 57 may be formed of two layers of glass—a first layer proximate the preform and a second layer on the opposite side of the first layer from the preform such that the second layer is spaced from the preform by the first layer. In this embodiment, the first layer is typically stiffer than the second layer, thereby reducing the infiltration of the glass into voids in the preform 58.

Figure 10:
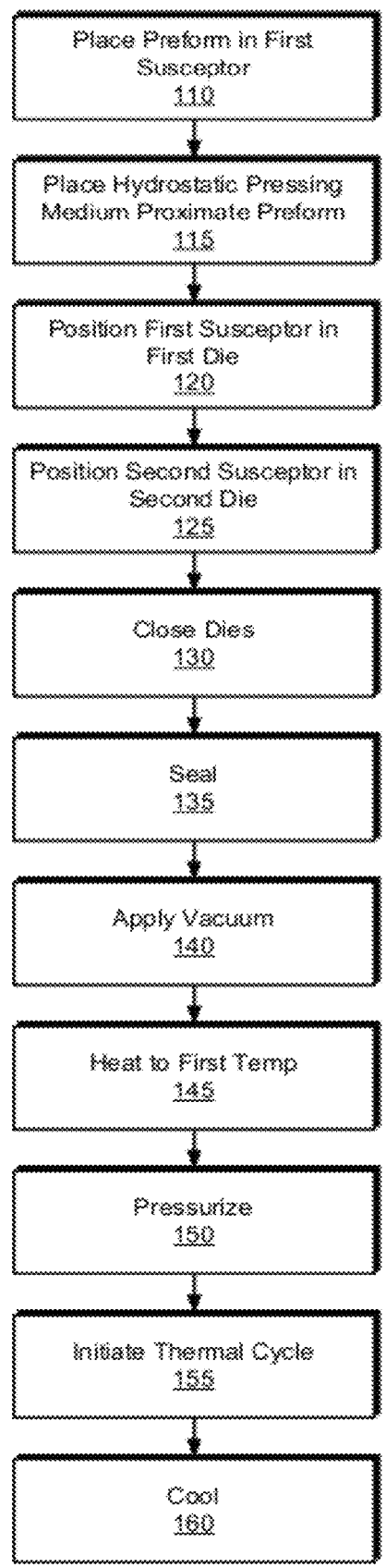
FIG. 10 is a flow diagram illustrating the steps of a method for molding a composite part, according to embodiments.
Figure 11:
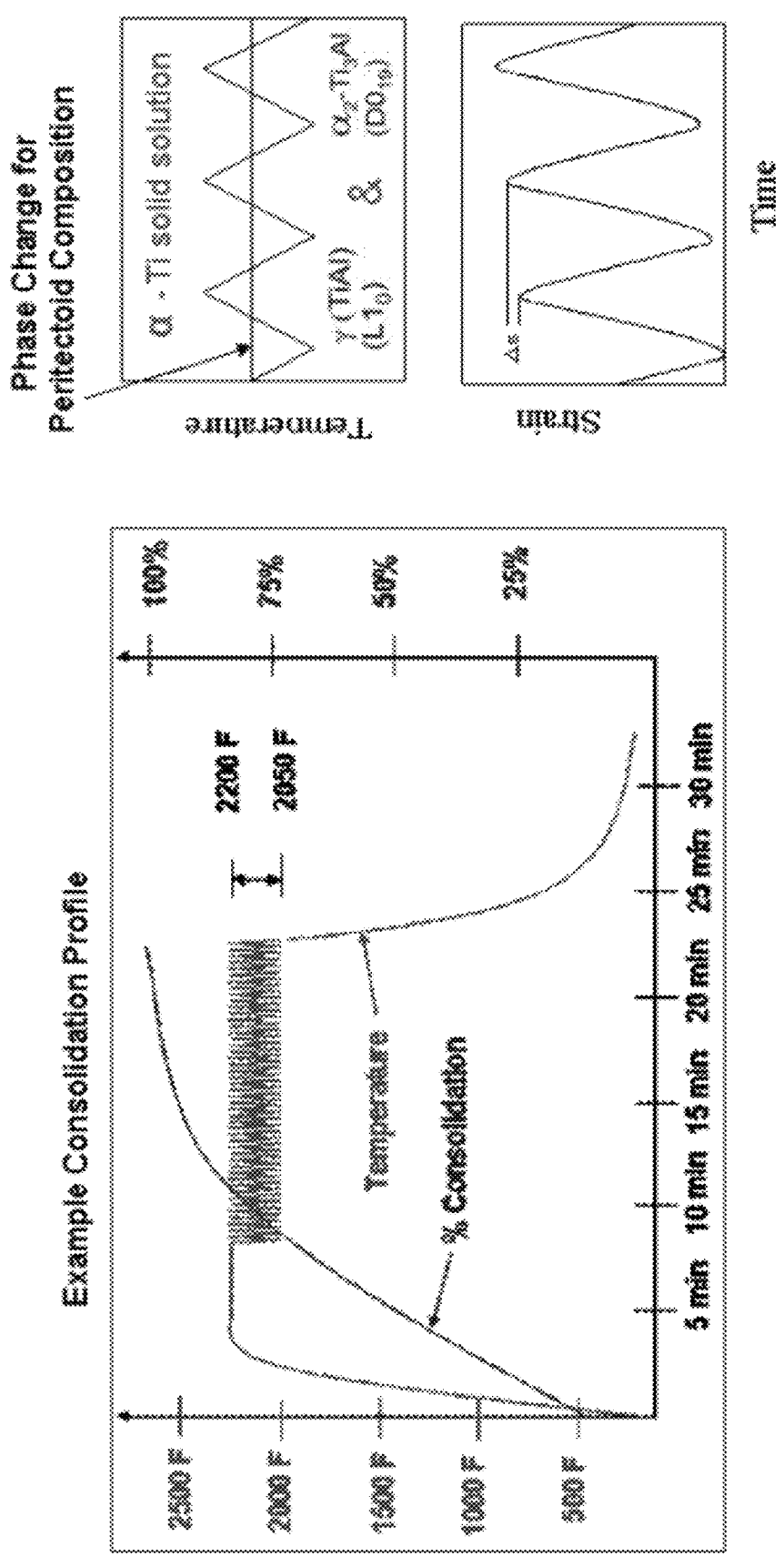
FIG. 11 is a graph illustrating an exemplary thermal oscillation cycle, according to embodiments.

Referring now to FIGS. 8-11, with particular reference to FIG. 10, a method to form a composite part from a metallic composite powder preform begins at operation 110 where the preform 58 is loaded into a susceptor 21a. At operation 115 the hydrostatic pressing medium is placed proximate the preform 58. At operation 120 the first susceptor 21a (including the preform and the hydrostatic pressing medium 57) is positioned in the first die 28. At operation 125 the susceptor 20a is positioned in the die 28. At operation 130 the dies are closed such that the susceptors 20a, 21a define a mold cavity 33. At operation 135 continued pressure is applied by the dies 28 such that the mold cavity 33 is sealed.

Once the mold cavity is sealed the vacuum pump 55 is activated to apply a vacuum to the mold cavity 33. At operation 545 the induction coils 26 are energized, causing the susceptors 20a, 21a to be inductively heated to a first threshold temperature. In general, the first threshold temperature may be a function of the phase change properties of the specific metallic composite powder from which the preform 58 is formed. Thus, one skilled in the art will recognize that the phase first threshold temperature may also be a function of the pressure applied by the die 28. In one embodiment in which the preform 58 is formed from a titanium aluminide alloy compound, the first threshold temperature is a temperature above the alpha phase eutectoid transition temperature of 1111 C. When the susceptors 20a, 21a of a near pure cobalt composition have been heated to a threshold temperature, a consolidation pressure is applied (operation 150). In some embodiments consolidation pressures may be in the range of 3 KSI.

Under the temperature and pressure the viscosity of the hydrostatic pressing medium 57 increases, as described above, such that the hydrostatic pressing medium applies a substantially uniform pressure across the entire surface of the preform 58.

At operation 155 a thermal cycle is initiated. In one embodiment thermal oscillation may be initiated once a density of approximately 85% is reached. During the thermal oscillation cycle temperature control system 65 alternately activates the cooling system 14 and the induction coils allow for alternate active (forced gas) cooling and induction heating of the susceptors to provide the thermal cycling. The thermal oscillation cycle repeatedly cycles the temperature of the mold cavity 33 from a temperature at which the titanium aluminide in the preform 58 exists in a mixture of Gamma and Alpha2 phases to the eutectoid temperature (1111 C) at which the titanium aluminide in the preform exists in the Alpha phase. This introduces additional forces inside the material due to the volumetric mismatch between phases, which in turn speeds up the consolidation of the titanium aluminide composite in the preform 58 as it approaches full density. In the embodiment depicted in FIG. 11 the temperature is cycled between a high temperature of 2050° F. or 1121 C (cobalt's curie point) and a low temperature of 2000° F. or 1093 C about the eutectoid temperature of 2031 F or 1111 C.

Once the titanium aluminide reaches a threshold density the thermal cycle may be terminated and the die may be cooled (operation 160). In some embodiments the die may be allowed to cool passively, while in other embodiments the die may be cooled actively using the cooling system 14. Once the die has cooled the composite part formed from the preform 58 may be removed from the mold.

Figure 12:
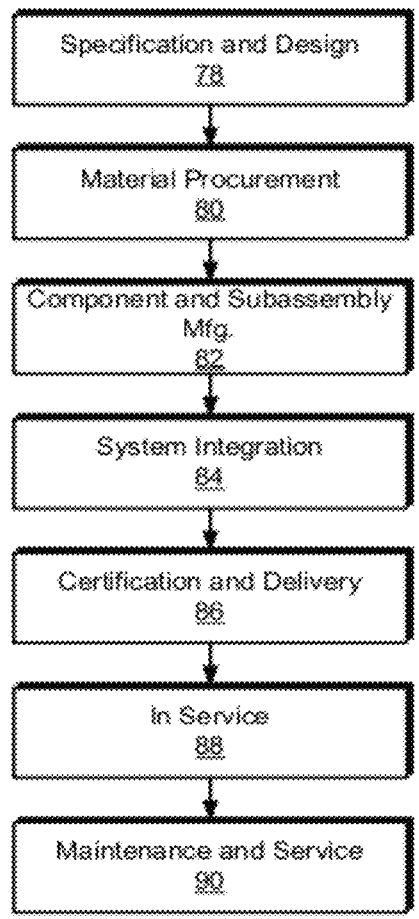
FIG. 12 is a flow diagram of an aircraft production and service methodology, according to embodiments.
Figure 13:
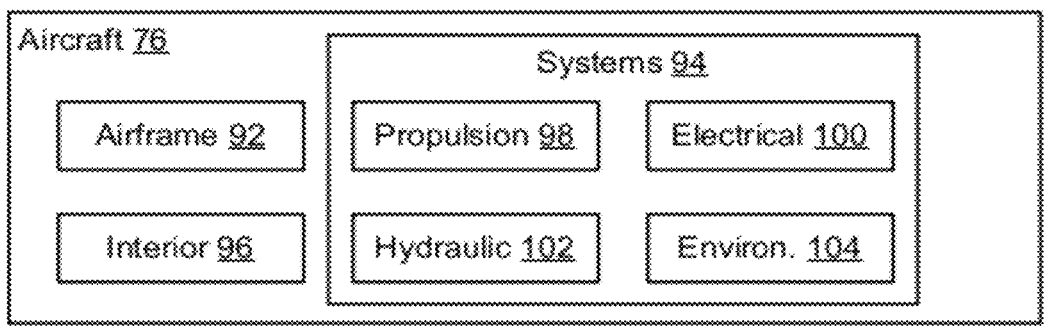
FIG. 13 is a block diagram of an aircraft, according to embodiments.

Referring next to FIGS. 12 and 13, embodiments of the disclosure may be used in the context of an aircraft manufacturing and service method as shown in FIG. 12 and an aircraft 76 as shown in FIG. 13. Aircraft applications of the disclosed embodiments may include, for example, without limitation, composite stiffened members such as fuselage skins, wing skins, control surfaces, hatches, floor panels, door panels, access panels and empennages, to name a few. These materials may also find use in applications in gas turbine/rocket engine components such as compressor blades and disks, and gas turbine blades and disks, and ramjet/scramjet engine components. During pre-production, exemplary method may include specification and design 78 of the aircraft 76 and material procurement 80. During production, component and subassembly manufacturing 82 and system integration 84 of the aircraft 76 takes place. Thereafter, the aircraft 76 may go through certification and delivery 86 in order to be placed in service 88. While in service by a customer, the aircraft 76 is scheduled for routine maintenance and service 90 (which may also include modification, reconfiguration, refurbishment, and so on).

Each of the processes of method may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 76 produced by exemplary method may include an airframe 92 with a plurality of systems 94 and an interior 96. Examples of high-level systems 94 include one or more of a propulsion system 98, an electrical system 100, a hydraulic system 102, and an environmental system 104. Any number of other systems may be included. Although an aerospace example is shown, the principles of the invention may be applied to other industries, such as the automotive industry.

The apparatus embodied herein may be employed during any one or more of the stages of the production and service method. For example, components or subassemblies corresponding to production process 82 may be fabricated or manufactured in a manner similar to components or subassemblies produced while the aircraft 76 is in service. Also, one or more apparatus embodiments may be utilized during the production stages 82 and 84, for example, by substantially expediting assembly of or reducing the cost of an aircraft 76. Similarly, one or more apparatus embodiments may be utilized while the aircraft 76 is in service, for example and without limitation, to maintenance and service 90.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to form a composite part from a metallic composite powder, comprising:
    placing a metallic composite powder preform in a first susceptor,
    covering at least a portion of the metallic composite powder with a hydrostatic pressing medium;
    positioning the first susceptor in a first die;
    positioning a second susceptor in a second die, opposite the first susceptor;

moving at least one of the first die or the second die to bring the first susceptor in contact with the second susceptor, thereby forming a mold cavity;

sealing at least a portion of the mold cavity;

applying a vacuum to at least a portion of the mold cavity;

heating the mold cavity to a first processing temperature;

applying a pressure to the mold cavity; and applying a thermal oscillation cycle to the mold cavity, wherein the thermal oscillation cycle oscillates the temperature of the mold cavity between a first temperature in which the metallic composite powder is in a first phase and a second temperature in which the metallic composite powder is in a second phase, different from the first phase, wherein the thermal oscillation cycle repeatedly cycles the mold between a first temperature above which at least one component of the metallic composite powder is in an alpha phase and a second temperature at which at least one component of the metallic composite powder is in a gamma phase.

2. The method of claim 1, wherein the metallic composite powder comprises a titanium aluminide powder.

3. The method of claim 2, wherein the hydrostatic pressing medium comprises an amorphous material.

4. The method of claim 1, wherein heating the mold cavity to a first processing temperature comprises heating the mold cavity to a temperature above which at least one component of the metallic composite powder transitions to an alpha phase.

5. The method of claim 4, wherein:

hydrostatic pressing medium changes to a liquid phase with a viscosity greater than $10^3$ at a temperature below the first temperature; and wherein applying a pressure to the mold cavity causes the hydrostatic pressing medium to apply a substantially even pressure to the metallic composite powder preform.

6. The method of claim 1, wherein repeatedly cycling the mold between the first and second temperatures comprises:

determining that the mold is at the second temperature below the alpha transus temperature range of the mold by detecting that a cooling rate of the mold has returned to a more rapid cooling rate following a decrease in the cooling rate within the alpha transus temperature range;

heating the mold in response to a determination that the mold is at the second temperature;

determining that the mold is at the first temperature above the alpha transus temperature range of the mold by detecting that the susceptor has reached a Curie temperature; and causing the mold to be cooled in response to a determination that the mold is at the first temperature.

7. A method to form a composite part from a metallic composite powder, comprising:

positioning a metallic composite powder preform in a mold cavity formed by a first susceptor and a second susceptor;

heating the mold cavity to a first processing temperature;

applying a pressure to the mold cavity; and applying a thermal oscillation cycle to the mold cavity, wherein the thermal oscillation cycle oscillates the temperature of the mold cavity between a first temperature in which the metallic composite powder is in a first phase and a second temperature in which the metallic composite powder is in a second phase, different from the first phase, wherein the thermal oscillation cycle repeatedly cycles the mold between a first temperature above which at least one component of the metallic composite powder is in an alpha phase and a second temperature at which at least one component of the metallic composite powder is in a gamma phase.

8. The method of claim 7, wherein heating the mold cavity to a first processing temperature comprises heating the mold cavity to a temperature above which at least one component of the metallic composite powder transitions to an alpha phase.

9. The method of claim 8, further comprising:

covering at least a portion of the metallic composite powder with a hydrostatic pressing medium which changes to a liquid phase with a viscosity greater than $10^3$ at a temperature below the first temperature; and applying a pressure to the mold cavity such that the hydrostatic pressing medium to apply a substantially even pressure to the metallic composite powder preform.

10. The method of claim 7, wherein repeatedly cycling the mold between the first and second temperatures comprises:

determining that the mold is at the second temperature below the alpha transus temperature range of the mold by detecting that a cooling rate of the mold has returned to a more rapid cooling rate following a decrease in the cooling rate within the alpha transus temperature range;

heating the mold in response to a determination that the mold is at the second temperature;

determining that the mold is at the first temperature above the alpha transus temperature range of the mold by detecting that the susceptor has reached a Curie temperature; and causing the mold to be cooled in response to a determination that the mold is at the first temperature.

* * * * *